Oct. 6, 1964    D. S. NELSON    3,151,726
TRAVELING CONVEYOR
Filed Aug. 4, 1961    4 Sheets-Sheet 3

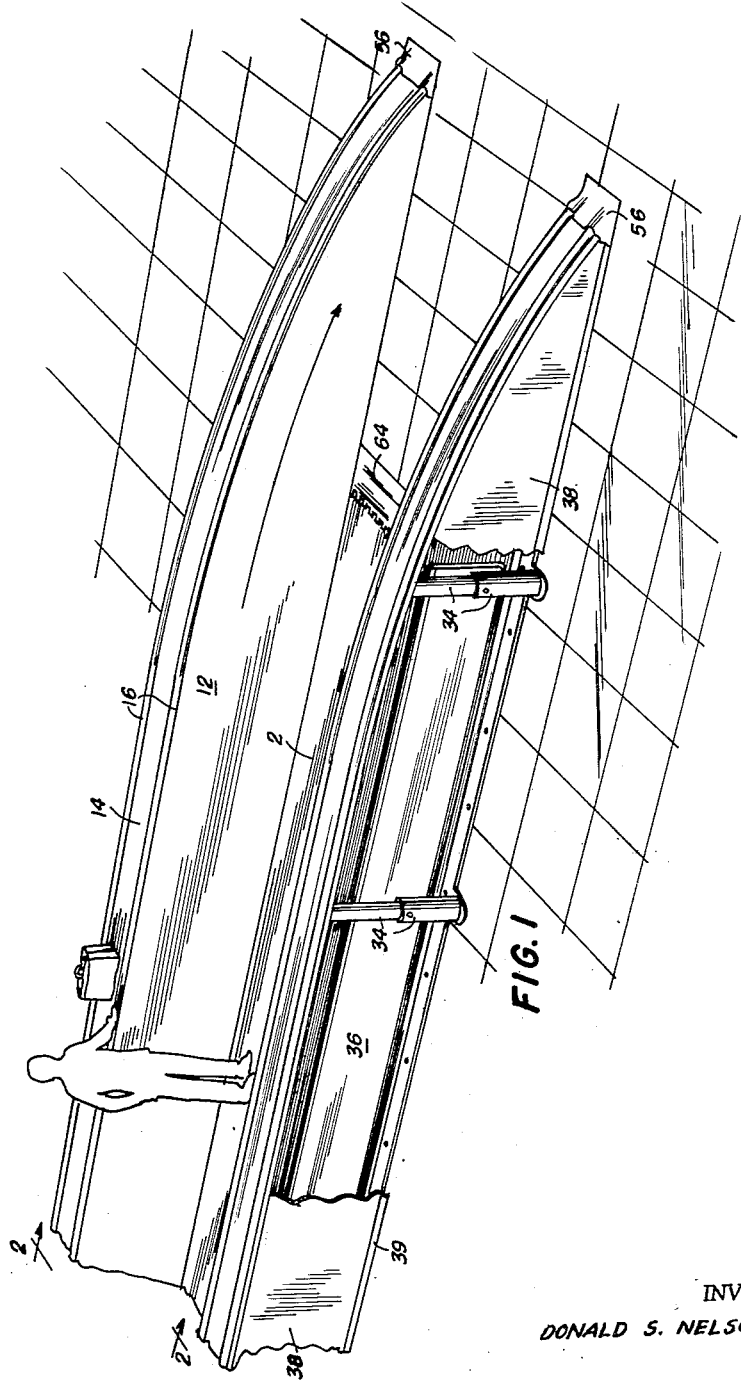

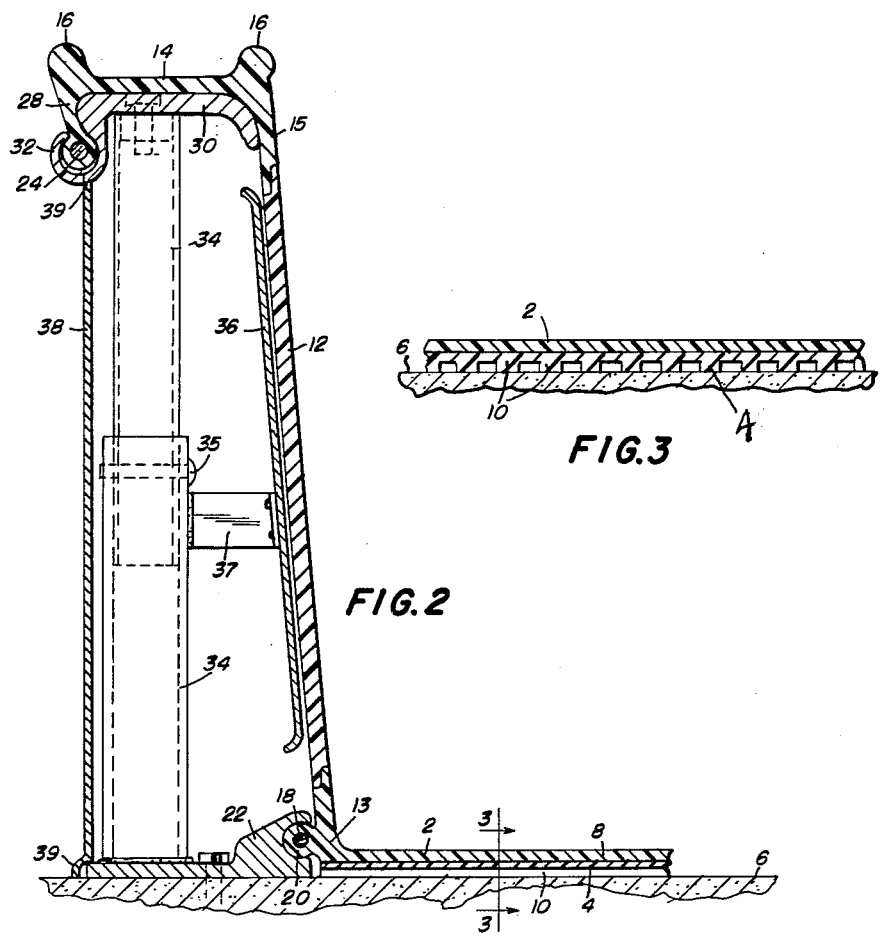
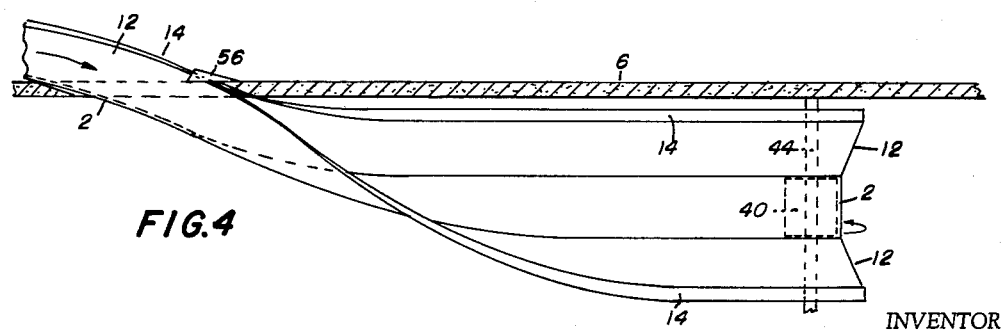

INVENTOR
DONALD S. NELSON
BY Fisher, Christen and Goodson
ATTORNEYS

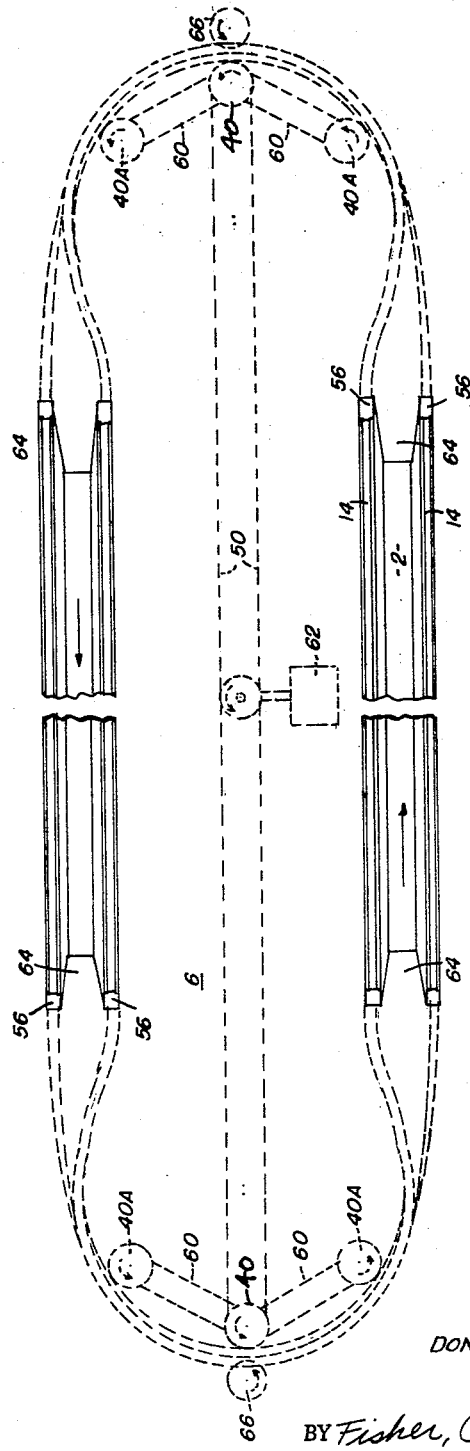

United States Patent Office 3,151,726
Patented Oct. 6, 1964

3,151,726
TRAVELING CONVEYOR
Donald S. Nelson, 1807 Commerce St., Dallas 1, Tex.
Filed Aug. 4, 1961, Ser. No. 129,305
15 Claims. (Cl. 198—16)

This invention is a passenger conveyor of the continuously traveling type, for use particularly at airports, but also capable of use in railway and bus terminals, stores and the like. The conveyor also carries the hand baggage of the passenger.

The conveyor comprises a traveling floor, and side walls joined integrally with the floor along their junction lines so that there is no crack at such junction lines; such cracks are undesirable and dangerous, in that the foot of a passenger, especially that of a child, or a cane or an umbrella, might get caught in such a crack.

The conveyor also comprises a hand rail, joined integrally with the upper edges of the side walls, without a crack at such junction. This hand rail is made extra wide for carrying the passenger's hand baggage.

The traveling floor, side walls and hand rail are made of any suitable, flexible and elastic material, such for example, as natural or synthetic rubber, such as neoprene, or one or more of the well known synthetic plastics, such as vinyl plastic, high density polyethylene, polypropylene, polyvinyl chlorides, etc.

The floor, two walls and hand rails form in effect a trough, where the whole assembly moves along as a unit, with a minimum of danger of having a passenger catch his hand or foot or clothing in any part thereof. The conveyor is entirely flexible, which is necessary for reversing the direction of travel at the ends of the conveyor.

The conveyor is provided with reenforcing cables moulded therein, two such cables being near the respective junction of the floor and side wall, and two more at the outer part of the hand rail. These moulded in cables provide longitudinal projections which fit into fixed slotted guides for holding the conveyor in place.

Further advantages of construction and operation will be described in connection with the accompanying drawings, illustrating a preferred way of carrying out the invention.

In these drawings, FIG. 1 is a perspective view of one end of the conveyor.

FIG. 2 is an enlarged cross section on line 2—2 of FIG. 1, showing approximately one-half of the conveyor.

FIG. 3 is a fragmentary cross section on line 3—3 of FIG. 2.

FIG. 4 is a diagrammatic view, showing the conveyor making a turn.

FIG. 7 is a diagrammatic plan view of the entire conveyor.

Figure 5:
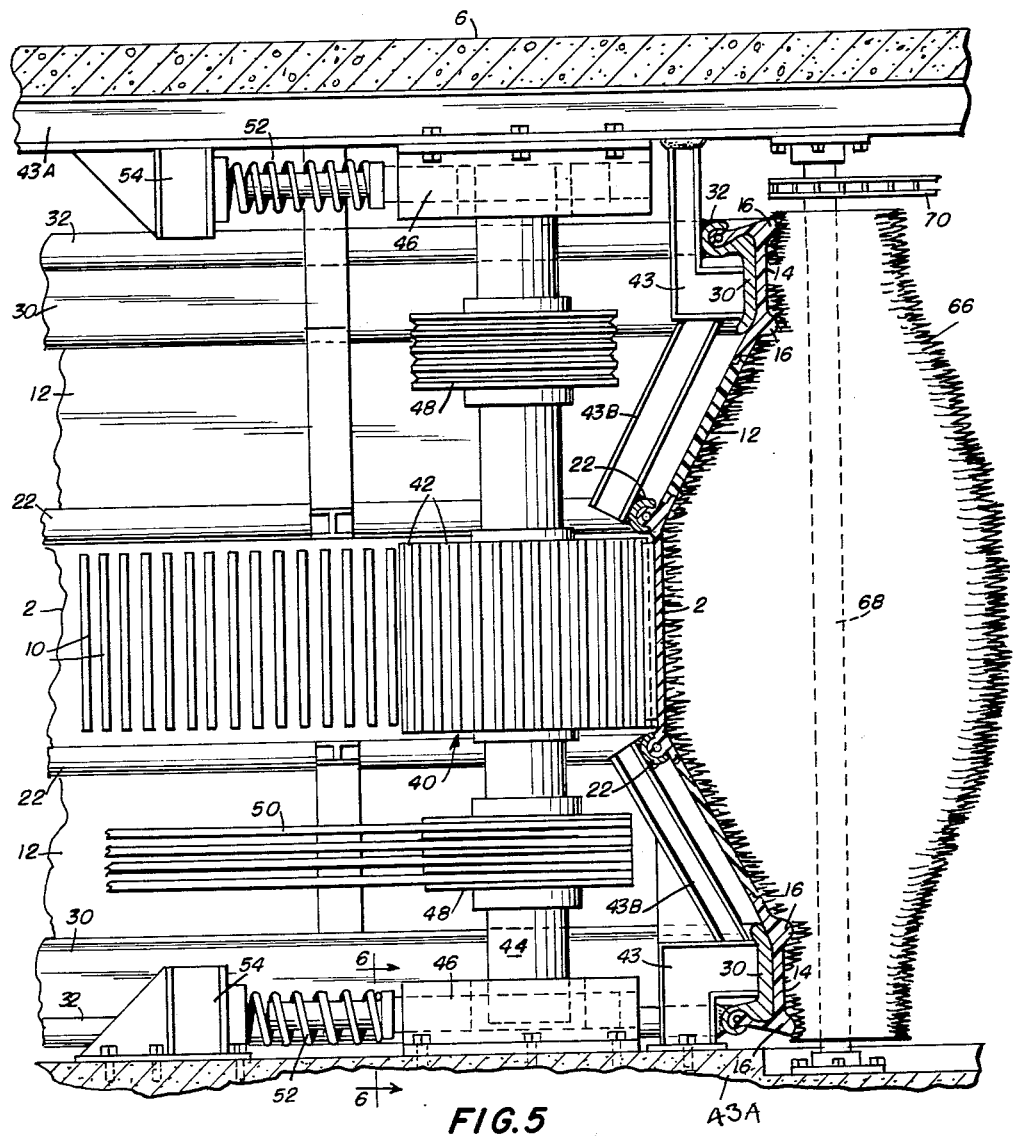
FIG. 5 is an enlarged sectional side view of one end of the conveyor, partly in section.
Figure 6:
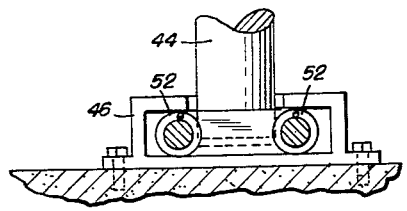
FIG. 6 is a section on line 6—6 of FIG. 5.

Referring now to these drawings, the conveyor comprises a floor 2 on the underside of which is a sheet 4 of some material such as "Teflon" or the like, which is readily slidable on base member 6. The sheet 4 is provided with transverse corrugations 10, which serve as gear teeth, as will be explained.

Joined integrally with floor 2 are side walls 12 along their contiguous meeting edges 13 so that there is no crack where they join. The upper edges of side walls 12 are joined integrally and flexibly with hand rail or guide rail 14, at 15. Rail 14 has spaced parallel ridges 16 defining a baggage space therebetween.

In order to guide and control the conveyor, flexible cables 18 are moulded into extensions of floor 2, thereby forming longitudinal guide ribs 20, which slidably engage in slotted guides 22 carried by floor 6.

Flexible cables 24 are also moulded into extension 26 of the guide rail, thereby forming longitudinal guide ribs 28.

Guide rail 14 slides on a guide plate 30, the underside of guide rail 14 being surfaced with "Teflon" or the like for minimizing friction. On the top surface of guide plate 30 could be surfaced with a similar friction reducing material. Guide plate 30 includes a slotted guide 32 into which the ribs 28 carrying cables 24 slidably engage.

Guide plates 30 are supported by two-part telescoping standards 34, the vertical height of which is adjustable by threaded engagement between the parts, the lock pin 35 serving to hold them in adjusted position.

In order to support side walls 12, inside supporting panels 36, braced by one or more brackets 37 from standards 34, bear lightly against walls 12.

The outside of the conveyor, FIG. 2 is provided with a covering and supporting panel 38 secured at any convenient points 39 to the conveyor structure.

In order to make a reverse turn at one end, the conveyor is tilted 90° into a vertical plane so that the turn is made about a vertical axis, as shown in FIGS. 4 and 5. The structural features for effecting the reverse turn and for maintaining the proper tension on the conveyor and for driving it, are shown in FIG. 5. The reverse turn is made by passing the bottom portion of the conveyor, that part having the transverse corrugations 10, around a toothed wheel 40 having corrugations or gear teeth 42 thereon which mesh with corrugations or teeth 10 of conveyor floor 2. Gear wheel 40 is mounted on shaft 44 in suitable bearings 46. The shaft 44 is provided with driving pulleys 48 and driving belts 50, to form a drive for the conveyor.

As shown in FIG. 5, framing members 43 mounted on the walls 43A support the guide plates 30 and guide rails 14, and diagonal framing members 43B, supported by 43, support and guide the slotted guides 22.

In order to maintain proper tension on the conveyor, shaft 44 and its gear wheel 40 are spring pressed to the right, by means of compression springs 52 arranged in pairs, pressing against shaft bearings 46. The tension on the springs can be varied as desired, as by having their respective abutments 54 variably positionable on the supporting frame.

The mechanism for effecting the reverse U-turn shown in FIG. 5 is underneath and beyond the right hand end of the conveyor as shown in FIG. 1.

As shown at the right of FIG. 5, the walls 12 and hand rails 14 are spread apart or somewhat flattened, for facilitating the turn. Slotted guideways 22 near each edge of the conveyor floor, and slotted guideways 32 at the outer edge of the hand rail, are provided as before. Guide plates 30 for the hand rail 14 are provided as before. Guide plates 30 for the hand rail 14 are provided as shown. One or more guides 56, diagrammatically shown in FIG. 4, are provided for starting the conveyor on its 90° turn.

Further guiding and propelling means for the conveyor are shown diagrammatically in FIG. 7. In addition to the main drive gear wheel 40, additional and similar auxiliary guide and gear wheels 40A are provided. These gear and guide wheels 40A turn on vertical axes, are provided with teeth like teeth 42 on wheel 40, which engage with corrugations 10 of the conveyor. Wheels 40A are driven by chain or belt drives 60 from driven shaft 44 FIG. 5. Wheels 40A are preferably provided with bearings spring pressed toward the conveyor, analogous to the springs pressed bearings 46, 52 for shaft 44. A centrally positioned motor 62 drives the drive belts 50 FIG. 5, for shaft 44.

As shown in FIG. 1, the movable floor 2 of the conveyor passes beneath the fixed floor at 64, and the guide rails 14 sloped downwardly toward and into the fixed floor, so that any baggage thereon slides onto the fixed floor.

In order to keep the conveyor clean, a rotating brush 66 may be provided, conforming to the shape of the conveyor as it makes the turn, as in FIG. 5. This brush is on a shaft 68 driven by a chain 70 engaging with sprocket 72 on shaft 68, chain 70 being driven in any convenient way.

While the preferred embodiment of the invention has been described in some detail, it should be understood that the disclosure is illustrative rather than restrictive and that the invention may be carried out in other ways, as falling within the scope of the following claims.

I claim as my invention:

1. A passenger conveyor, comprising a flat flexible, continuously extending traveling floor; flexible, continuous, and continuously traveling side walls and flat, flexible, continuously extending and continuously traveling hand rails, said floor, side walls and hand rails being integrally united at their respective junctions for simultaneous movement, said floor and side walls and hand rails being of flexible material for passing around curves, and horizontal supports positioned beneath said hand rails, for slidably supporting them.

2. The combination of claim 1, further including flexible cable means secured to at least one of said continuously traveling members for propelling the conveyor.

3. A passenger conveyor, comprising a flat flexible, continuously extending traveling floor; flexible, continuous, and continuously traveling side walls and flat, flexible, continuously extending and continuously traveling hand rails, said floor, side walls and hand rails being made of synthetic, flexible plastic material for passing around curves, flexible cable means moulded into said synthetic flexible plastic material for propelling the conveyor, and horizontal supports positioned beneath said hand rails, for slidably supporting them.

4. A passenger conveyor, comprising a flat flexible, continuously extending traveling floor; flexible, continuous, and continuously traveling side walls and flat, flexible, continuously extending and continuously traveling hand rails, said floor, side walls and hand rails being made of synthetic, flexible plastic material for passing around curves, and being integrally united along their respective junction lines, flexible cable means moulded into said synthetic flexible plastic material for propelling the conveyor, and horizontal supports positioned beneath said hand rails, for slidably supporting them.

5. A passenger conveyor, comprising a flat flexible, continuously extending traveling floor; flexible, continuous, and continuously traveling side walls and flat, flexible, continuously extending and continuously traveling hand rails, said floor, side walls and hand rails being made of synthetic, flexible plastic material for passing around curves, flexible cables secured along opposite edges of the floor, for propelling the conveyor, and horizontal supports positioned beneath said hand rails, for slidably supporting them.

6. A passenger conveyor, comprising a flat flexible, continuously extending traveling floor; flexible, continuous, and continuously traveling side walls and flat, flexible, continuously extending and continuously traveling hand rails, said floor, side walls and hand rails being made of synthetic, flexible plastic material for passing around curves, flexible cables moulded into opposite longitudinal edges of the floor, and into the hand rail, for propelling the conveyor, and horizontal supports positioned beneath said hand rails, for slidably supporting them.

7. A continuously traveling passenger conveyor, comprising a flat continuously extending and continuously traveling floor and two substantially vertical, continuous side walls flexibly joined together along their longitudinal meeting edges, means for propelling the floor and side walls, together as a unit, means at the ends of the conveyor for guiding and turning the floor and side walls about 90° about a vertical axis for effecting a U-turn of 180°, and means for guiding and turning the floor and side walls about 90° about a vertical axis in the reverse direction after the U-turn has been effected.

8. The combination of claim 7, further including a power driven brush engageable with the floor of the conveyor as it makes its U-turn.

9. A continuously traveling passenger conveyor, comprising a continuously extending and continuously traveling floor and continuously extending and continuously traveling side walls flexibly joined together along their longitudinal meeting edges, hand rails flexibly joined to the upper longitudinal edges of said side walls, means for propelling the floor, side walls and hand rails together as a unit, means at the ends of the conveyor for turning the conveyor about 90° about a vertical axis and for spreading the walls and guide rails away from the conveyor floor, for effecting a U-turn, and means for turning the walls and hand rails about 90° about a vertical axis in the reverse direction after the U-turn has been effected.

10. The combination of claim 7, further including a power driven brush, engageable with the floor and side walls of the conveyor as it makes its U-turn.

11. A continuously traveling passenger conveyor comprising a flexible horizontal floor, continuously extending, continuously traveling, substantially vertical flexible side walls, having their lower edges joined integrally with the lateral longitudinal edges of the floor, a flexible, continuously extending and continuously traveling horizontal hand and baggage rail joined integrally with the upper longitudinal edge of one side wall, a horizontally extending support below the hand and baggage rail for supporting said rail, and a propelling cable secured in the lateral longitudinal edges of said floor.

12. The combination of claim 11, further including a second propelling cable molded into said hand and baggage rail.

13. The combination of claim 11, further including a vertically extending, substantially flat support on the outside of said vertically extending side walls, for supporting said side walls.

14. A continuously traveling passenger conveyor, comprising a substantially flat, flexible floor made of plastic material, and upwardly extending lateral side walls joined to said floor along the longitudinal edges of said floor, the underside of said floor being provided with a plurality of transversely extending gear teeth, a transversely extending gear wheel at one end of said conveyor around which the said floor passes, the teeth of said gear wheel meshing with said gear teeth of the floor in driving relationship, and means for driving said gear wheel.

15. The combination of claim 14, further including variably positionable, spring mounted bearings for the shaft of said gear wheel.

References Cited in the file of this patent

UNITED STATES PATENTS

| | | |
|---|---|---|
| 575,142 | Bowers | Jan. 12, 1897 |
| 765,648 | Baltzey | July 19, 1904 |
| 766,013 | Baldwin | July 26, 1904 |
| 2,753,980 | Ballard | July 10, 1956 |

FOREIGN PATENTS

| | | |
|---|---|---|
| 1,038,277 | France | Sept. 28, 1953 |